United States Patent
Gsellmann et al.

(10) Patent No.: US 6,395,330 B1
(45) Date of Patent: May 28, 2002

(54) METHOD FOR PRODUCING IMPREGNABLE FINE MICA TAPES WITH AN INCORPORATED ACCELERATOR

(75) Inventors: Helmut Gsellmann; Bernard Hafner; Michael Raber, all of Graz (AT)

(73) Assignee: Isovolta Osterreichische Isolierstoffwerke Aktiengesellschaft, Wiener Neudorf (AT)

( * ) Notice: Subject to any disclaimer, the term of this patent is extended or adjusted under 35 U.S.C. 154(b) by 0 days.

(21) Appl. No.: 09/581,657

(22) PCT Filed: Oct. 13, 1999

(86) PCT No.: PCT/EP99/07668

§ 371 (c)(1),
(2), (4) Date: Aug. 7, 2000

(87) PCT Pub. No.: WO00/24006

PCT Pub. Date: Apr. 27, 2000

(30) Foreign Application Priority Data

Oct. 16, 1998 (EP) .............................................. 98890305

(51) Int. Cl.⁷ ............................... B05D 1/12; B05D 5/12
(52) U.S. Cl. ........................ 427/116; 427/201; 427/202; 427/386
(58) Field of Search ................................. 427/201, 202, 427/204, 208.8, 370, 386, 58, 104, 116, 180; 29/596, 597, 598; 428/324

(56) References Cited

U.S. PATENT DOCUMENTS 3,841,959 A * 10/1974 Merten
4,033,805 A * 7/1977 Mitsui et al.

FOREIGN PATENT DOCUMENTS

| DE | 2142571 | 6/1972 |
|----|---------|--------|
| EP | 0031555 A1 | 7/1981 |
| EP | 0 031 555 | * 7/1981 |
| EP | 0194974 | 9/1986 |
| EP | 0355558 A1 | 2/1990 |
| FR | 2132688 | 11/1972 |
| JP | 55011852 | 1/1980 |
| JP | 7149928 | 6/1995 |

* cited by examiner

Primary Examiner—Fred J. Parker
(74) Attorney, Agent, or Firm—Young & Thompson

(57) ABSTRACT

A process for producing impregnable fine mica tapes with a built-in accelerator which after winding onto the conductors of the windings of electrical machines are impregnated with a solvent-free impregnation resin and are then cured under the action of heat. The fine mica film is sprinkled with a powder epoxy resin system which contains a curing agent and the side of the fine mica film which has been sprinkled with the powder epoxy is cemented to a carrier material, the powder epoxy resin system curing under the influence of temperature.

5 Claims, 1 Drawing Sheet

METHOD FOR PRODUCING IMPREGNABLE FINE MICA TAPES WITH AN INCORPORATED ACCELERATOR

The invention relates to a process for producing impregnable fine mica tapes with a built-in accelerator which after winding onto the conductors of the windings of electrical machines are impregnated with a solvent-free impregnation resin and afterwards are cured under the action of heat, the fine mica film being sprinkled with a powder epoxy-resin systems and the side of the fine mica film which has been sprinkled with the powder epoxy being cemented to the carrier material under the influence of pressure and heat.

PRIOR ART

To insulate winding elements such as for example conductor rods in rotating high voltage electrical machines, the impregnation technique based on vacuum pressure impregnation has become very popular in recent years. In doing so the winding elements for construction engineering reasons are made either as performed coils or conductor bars, preferably Roebel bars. These winding elements are provided with mica-containing main insulation and are further treated in a vacuum pressure impregnation process. Here epoxy resins, preferably low-viscosity, solvent-free resin systems are used as the impregnation resins.

At this point they impregnate the mica-containing main insulation formed from several winding layers so that cavities which can cause partial discharges between the winding layers are completely filled.

The winding layers of the main insulation are formed by mica-containing insulating tapes. They consist of a fine mica film which is cemented to a carrier material by means of a powdered adhesive resin.

The carrier material should be porous so that the solvent-free impregnation resins can impregnate it. To accelerate the cross-linking reaction of the impregnation resin during the curing process the fine mica films used are also impregnated with an accelerator.

The powder epoxy-resin systems used are preferably resin systems which are free of curing agent and which have complete solubility in the impregnation resin and react into it during the curing process.

It is still possible with these accelerator-containing insulating tapes using powder epoxy-resin systems which are free of curing agent to impregnate insulating wall thicknesses up to roughly 3.5 mm completely and in a relative short impregnation time.

But it has been shown that with increasing size and power of generators relatively high insulating wall thicknesses become necessary which likewise are to be completely impregnated with solvent-free impregnation resin during the impregnation phase.

When using the aforementioned accelerator-containing mica tape which has a powder epoxy-resin systems which is free of curing agent it has however been shown that for high insulating wall thicknesses of more than 3.5 mm they are no longer completely impregnated with the impregnation resin. The unimpregnated winding layers are faults in the insulation system and therefore cause possible later failure.

DESCRIPTION OF THE INVENTION

Therefore the object of the invention is to eliminate the defects of these accelerator-containing mica tapes, defects known in the past from the prior art. As claimed in the invention, a powder epoxy-resin system which contains a curing agent and which cures very quickly at an elevated temperature when the fine mica film is cemented to the carrier material is incorporated into the initially named process for producing impregnable fine mica tapes with a built-in accelerator.

It was surprisingly found that by using a powder epoxy-resin system which contains a curing agent as the adhesive resin in accelerator-containing mica tapes likewise high insulating wall thicknesses exceeding 3.5 mm can be completely impregnated.

This technical effect is achieved by the fact that the powder epoxy-resin system which contains a curing agent cross links and represents a spot bond which is insoluble in the impregnation resin when the carrier material is cemented to the fine mica film. Since the spot bond wets only a small percentage of the impregnable surface of the carrier material, the remaining unwetted surface area can be easily impregnated. In addition, the curing of the cement prevents an undesirably fast reaction, as is the case in resin systems which are free of the curing agent and those which are soluble in the impregnation resin at roughly 60° C., between the powder enamel resin and impregnation resin during the impregnation phase so that even high insulating wall thicknesses are completely impregnated with impregnation resin.

Furthermore it is suggested as claimed in the invention that the powder epoxy-resin system which contains a curing agent has a bisphenol-A epoxy resin and a phenol novolak epoxy resin and that the curing agent used is an aminic curing agent, preferably a primary and/or secondary aliphatic resin.

Preferably the aminic curing agent is used in a minimum amount so that during curing a complete reaction of the amine groups with the oxiran groups of the epoxy resin is guaranteed.

The resulting compound thus has no primary amine functions, is insoluble in the impregnation resin, and thus it cannot exert an accelerating effect on it.

Other advantages of the process as claimed in the invention consist in that the carrier material used is a glass fabric, a formed fabric or a plastic film and that the fine mica film used is preimpregnated with an accelerator, preferably zinc naphthenate.

BRIEF DESCRIPTION OF THE DRAWINGS

A further understanding of the invention can be seen from the drawings in which.

DETAILED DESCRIPTION OF THE PREFERRED EMBODIMENT

Figure 1:
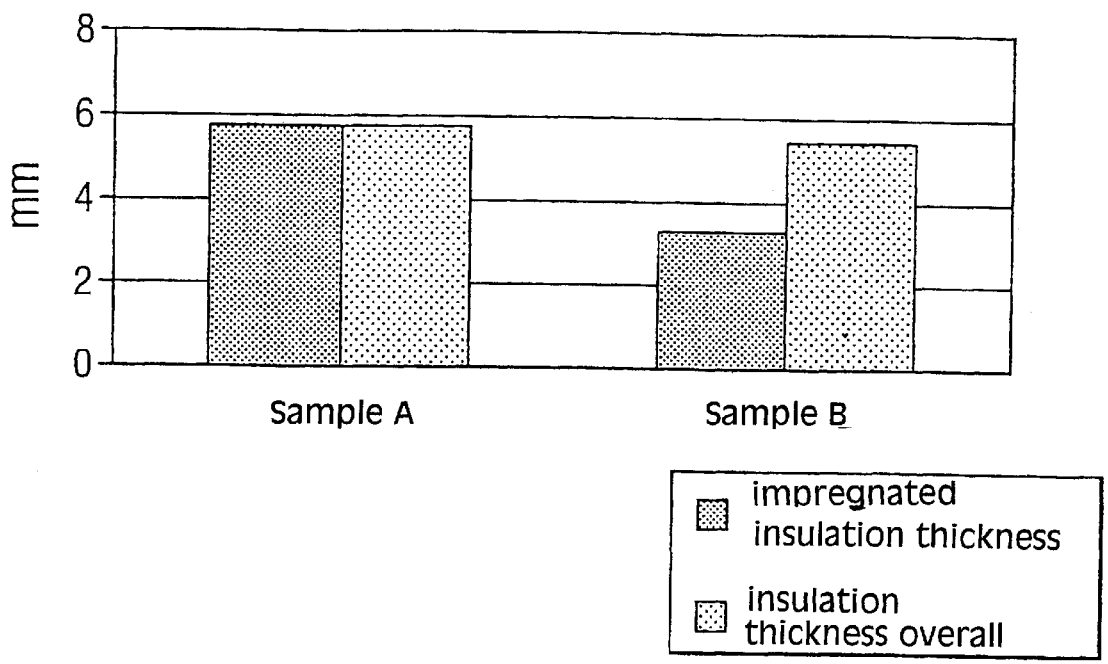
FIG. 1 shows a comparative drawing of the impregnated insulation thickness of the present invention.
Figure 2:
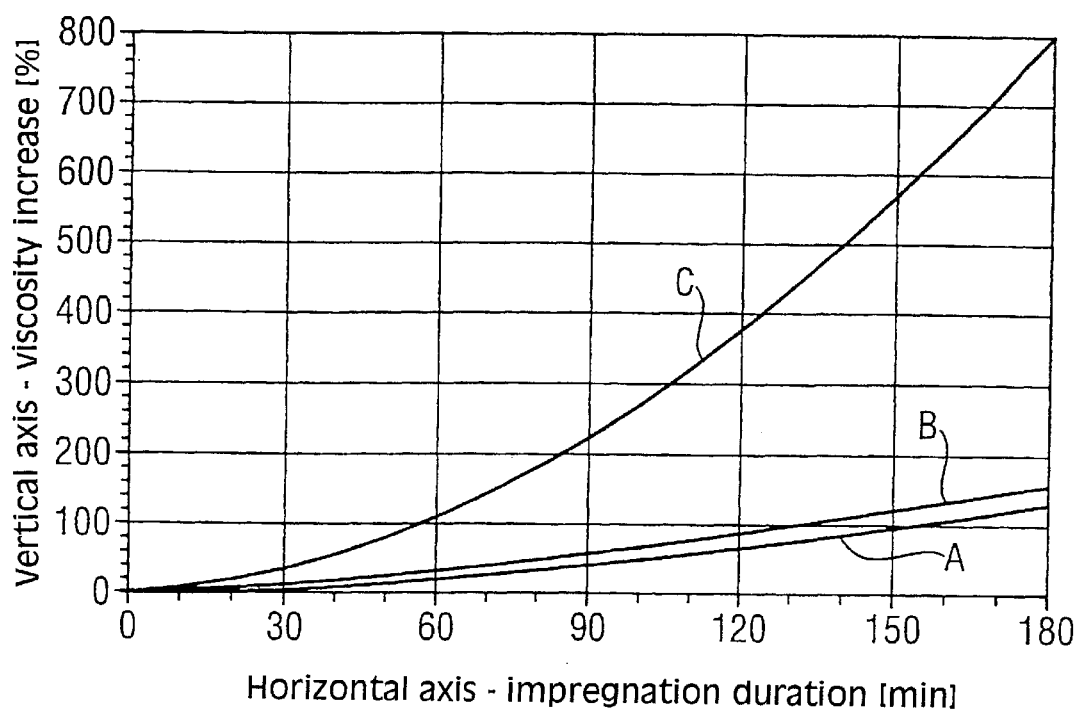
FIG. 2 shows the effect of impregnation duration on viscosity.

The invention is detailed using examples and diagrams as shown in FIGS. 1 and 2:

A fine mica film of uncalcined muscovite with a weight per unit area of 160 g/m$^2$ is impregnated with a solution of zinc naphthenate in methyl ethyl ketone. By evaporating the solvent the fine mica film is preimpregnated and then sprinkled with a powder epoxy-resin system which contains a curing agent, a system based on an epoxy resin mixture. For example it consists of a phenol novolak epoxy resin and a bisphenol-A-epoxy resin. A solid aminic curing agent is used as the curing agent. Curing agents based on primary and/or aliphatic amines are especially well suited. The softening point of the powder epoxy-resin system which contains a curing agent is roughly 85° C.

Then the fine mica film which has been sprinkled with a powder epoxy-resin system which contains a curing agent is transferred to a heatable calender so that the powder epoxy-resin is melted and is cemented to the carrier material supplied via a roller.

The following can be used as the carrier material:

a) a glass fabric with a mass per unit area of 23 g/m$^2$ which is coated with 2 g/m$^2$ of a flexibly cross-linking acrylic resin. To be able to cure it, the glass fabric is then temperature-treated at a temperature of 100° C., b) a glass fabric with a mass per unit area of 23 g/m$^2$ which is coated with 0.5 g/m$^2$ zinc naphthenate, or c) a polyester formed fabric with a mass per unit area of 20 g/m$^2$, or d) a polyester film with a mass per unit area of 42 g/m$^2$.

The advantage of a powder epoxy-resin system which contains a curing agent can be represented very well using the number of impregnated layers during vacuum pressure impregnation compared to known powder eposy-resin systems free of the curing agent and the insulating tapes produced therefrom.

For this reason profile rods are wound with 20 layers each of the insulating tape half-overlapped, the end faces of the insulation are sealed with resin and the conductor rods which have been produced in this way are impregnated with a solvent-free epoxy acid anhydride impregnation resin at 60° C. for three hours. After curing, the conductor rods are cut crosswise to measure the impregnation depth.

In the diagram shown in FIG. 1 the result is plotted using a sample A which is an insulating tape which has been produced using a powder epoxy-resin system which contains a curing agent according to sample version a), compared to a known mica-containing insulating tape (sample B) which however contains a powder epoxy which is free of the curing agent and which is soluble in an epoxy acid anhydride impregnation resin at roughly 60° C.

It can be seen from the diagram that the sample A which is a mica tape with a powder resin which contains a curing agent is impregnated in the entire winding cross section. Conversely sample B which represents a mica tape which has been produced with a powder epoxy free of the curing agent shows only partial impregnation of the layers, specifically only up to roughly two thirds. The reasons for this inadequate impregnation is that the cross-linking reaction between the powder epoxy-resin and solvent-free impregnation resin takes place quickly by the powder epoxy-resin which is free of the curing agent in conjunction with an accelerator such that an unwanted increase of viscosity of the impregnation resin occurs and finally the impregnation step comes to a complete standstill.

In the case as claimed in the invention using sample A conversely the accelerator component is preferably blocked by the curing of the powder epoxy-resin system such that impregnation of all layers is caused.

This unwanted increase of viscosity in the impregnation phase is explained using studies on various resin systems in a rheometer and is shown graphically in the diagram in FIG. 2.

As the reference systems a bisphenol A/acid anhydride resin which is accelerated only with zinc naphthenate (curve A), a bisphenol A/acid anhydride impregnation resin, zinc naphthenate and a powder epoxy-resin system which contains a curing agent (curve B) as claimed in the invention and a bisphenol A/acid anhydride impregnation resin, zinc naphthenate and a powder epoxy-resin system which does not contain a curing agent (curve C) as claimed in the invention were mixed together in the ratio of their parts by weight in completely impregnated insulation and the viscosity behavior was measured with a rheometer over time at 60° C.

Curve A reproduces the behavior of impregnation of an accelerator-containing fine mica tape as would proceed in the absence of disruptive additives (reactive cement systems) in the tape.

In spite of adding the powder epoxy-resin system which contains a curing agent the reference system as claimed in the invention according to curve B shows only a small viscosity increase relative to curve A.

The reference system as in the prior art according to curve C on the other hand after a short time has such a high viscosity increase that it must necessarily lead to a standstill of the impregnation step.

COMMERCIAL APPLICABILITY

Using the comparison examples and the aforementioned graphic representations as shown in FIGS. 1 and 2, it was shown that the fine mica tape produced using the process as claimed in the invention is especially well suited for preparing high insulating wall thicknesses as are necessary in high voltage machines, since in conjunction with the impregnation resins used it is satisfactorily impregnated and therefore faults in the insulation system can be prevented.

What is claimed is:

1. A process for insulating conductors of windings of electrical machines comprising the steps of:

applying a powder epoxy resin system to a first side of a particulate mica film;

adhesively bonding a first side of the film to a carrier material under pressure and heat, to form a tape;

winding the tape around the conductors; and impregnating the carrier material of the tape with a solvent-free impregnation resin comprising an aminic curing agent;

heating the tape to an elevated temperature, the aminic curing agent curing at said elevated temperature and being used in an amount so that during curing, a complete reaction of the amine group with oxiran groups of the epoxy resin takes place.

2. The process as claimed in claim 1, wherein the epoxy resin system is a mixture of a bisphenol-A-epoxy resin and a phenol novolak epoxy resin.

3. The process as claimed in claim 1, wherein the aminic curing agent is one of a primary or secondary aliphatic amines.

4. The process as claimed in claim 1, wherein the carrier material is one of a glass fabric, a formed fabric or a plastic film.

5. The process as claimed in claim 1, wherein, prior to said applying the epoxy resin step, the particulate-mica film is uniformly impregnated with an accelerator.

* * * * *